United States Patent
Iwano et al.

(10) Patent No.: US 12,352,619 B2
(45) Date of Patent: Jul. 8, 2025

(54) OPTICAL FIBER SENSING SYSTEM, OPTICAL FIBER SENSING METHOD, AND OPTICAL FIBER SENSING APPARATUS

(71) Applicant: NEC Corporation, Tokyo (JP)

(72) Inventors: Tadayuki Iwano, Tokyo (JP); Yoshiaki Aono, Tokyo (JP); Yoshinori Kitahara, Tokyo (JP); Satoru Ishii, Tokyo (JP)

(73) Assignee: NEC CORPORATION, Tokyo (JP)

( * ) Notice: Subject to any disclaimer, the term of this patent is extended or adjusted under 35 U.S.C. 154(b) by 401 days.

(21) Appl. No.: 17/908,078

(22) PCT Filed: Mar. 6, 2020

(86) PCT No.: PCT/JP2020/009653
§ 371 (c)(1),
(2) Date: Aug. 30, 2022

(87) PCT Pub. No.: WO2021/176683
PCT Pub. Date: Sep. 10, 2021

(65) Prior Publication Data
US 2023/0112149 A1    Apr. 13, 2023

(51) Int. Cl.
*G01H 9/00* (2006.01)
*G01D 5/26* (2006.01)
*G01L 1/24* (2006.01)

(52) U.S. Cl.
CPC .......... *G01H 9/006* (2013.01); *G01L 1/242* (2013.01); *G01D 5/268* (2013.01)

(58) Field of Classification Search
CPC ........ G01H 9/006; G01H 9/004; G01L 1/242; G01D 5/268; G01D 5/35351; G01K 11/32
See application file for complete search history.

(56) References Cited

U.S. PATENT DOCUMENTS

| 10,650,648 B2 * | 5/2020 | Englund ............. G08B 13/186 |
| 2017/0176243 A1 | 6/2017 | Ellmauthaler et al. |

FOREIGN PATENT DOCUMENTS

| JP | 2002-269656 A | 9/2002 |
| JP | 2007-198973 A | 8/2007 |
| JP | 2013-253831 A | 12/2013 |

OTHER PUBLICATIONS

International Search Report for PCT Application No. PCT/JP2020/009653, mailed on Apr. 21, 2020.

* cited by examiner

*Primary Examiner* — John Bedtelyon
(74) *Attorney, Agent, or Firm* — Sughrue Mion, PLLC

(57) ABSTRACT

An optical fiber sensing system according to the present disclosure includes: an optical fiber network (10) configured to detect first sensing information related to a first monitoring target and second sensing information related to a second monitoring target; a reception unit (21) configured to receive an optical signal from the optical fiber network (10); a specification unit (22) configured to specify a first monitoring target based on first sensing information superimposed on the optical signal and specify a second monitoring target based on second sensing information superimposed on the optical signal, and a provision unit (23) configured to provide information related to the first monitoring target and information related to the second monitoring target specified by the specification unit (22) for a service providing destination.

17 Claims, 15 Drawing Sheets

| DISTANCE FROM OPTICAL FIBER SENSING APPARATUS | AREA |
|---|---|
| a~b km | A |
| b~c km | B |
| c~d km | C |
| d~e km | D |
| : | : |

Fig. 2

| SERVICE PROVIDING DESTINATION | POLICY |
|---|---|
| 30A | MONITORING TARGET x |
| 30B | MONITORING TARGET y |

OPTICAL FIBER SENSING SYSTEM, OPTICAL FIBER SENSING METHOD, AND OPTICAL FIBER SENSING APPARATUS

This application is a National Stage Entry of PCT/JP2020/009653 filed on Mar. 6, 2020, the contents of all of which are incorporated herein by reference, in their entirety.

TECHNICAL FIELD

The present disclosure relates to an optical fiber sensing system, an optical fiber sensing method, and an optical fiber sensing apparatus.

BACKGROUND ART

While optical fibers are used to provide high-speed optical communication, optical fibers may also be used as sensors by monitoring variations in loss due to stress applied to the optical fibers.

For example, Patent Literature 1 discloses installing optical fiber sensors in a river area to observe, for example, deformation of a levee, transition in a dam body, or a river water level, or installing optical fiber sensors in an inner area of a levee to observe, for example, an inundation situation in an urban area.

CITATION LIST

Patent Literature

[Patent Literature 1] Japanese Unexamined Patent Application Publication No. 2002-269656

SUMMARY OF INVENTION

Technical Problem

Focus has recently been place on techniques for achieving advanced monitoring functions by monitoring a vibration, a sound, a temperature etc. superimposed on an optical signal transmitted through an optical fiber.

However, in recent years, as society requires an increased use of advanced information and automation technologies, it is required to monitor a wider variety of objects than before using optical fibers and there is a wider range of needs for services provided by the optical fibers, and thus it has become difficult to satisfy these needs by a simple individual monitoring function alone as disclosed in Patent Document 1.

In view of the aforementioned circumstances, an object of the present disclosure is to solve the aforementioned problem and to provide an optical fiber sensing system, an optical fiber sensing method, and an optical fiber sensing apparatus capable of providing services and applications by using more advanced optical fiber sensing using optical fibers that are installed in various locations and states.

Solution to Problem

An optical fiber sensing system according to one aspect includes:
an optical fiber network that detects first sensing information related to a first monitoring target and second sensing information related to a second monitoring target;
a reception unit configured to receive an optical signal from the optical fiber network;
a specification unit configured to specify the first monitoring target based on the first sensing information superimposed on the optical signal and specify the second monitoring target based on the second sensing information superimposed on the optical signal; and
a provision unit configured to provide information related to the first monitoring target and information related to the second monitoring target specified by the specification unit for a service providing destination.

An optical fiber sensing method according to one aspect is an optical fiber sensing method by an optical fiber sensing system, the optical fiber sensing method comprising:
a receiving step for receiving an optical signal from an optical fiber network that detects first sensing information related to a first monitoring target and second sensing information related to a second monitoring target;
a specifying step for specifying the first monitoring target based on the first sensing information superimposed on the optical signal and specifying the second monitoring target based on the second sensing information superimposed on the optical signal; and
a providing step for providing information related to the first monitoring target and information related to the second monitoring target specified in the specifying step for a service providing destination.

An optical fiber sensing apparatus according to one aspect includes:
a reception unit configured to receive an optical signal from an optical fiber network that detects first sensing information related to a first monitoring target and second sensing information related to a second monitoring target;
a specification unit configured to specify the first monitoring target based on the first sensing information superimposed on the optical signal and specify the second monitoring target based on the second sensing information superimposed on the optical signal; and
a provision unit configured to provide information related to the first monitoring target and information related to the second monitoring target specified by the specification unit for a service providing destination.

Advantageous Effects of Invention

According to the aforementioned aspect, it is possible to provide an optical fiber sensing system, an optical fiber sensing method, and an optical fiber sensing apparatus capable of providing services and applications by using more advanced optical fiber sensing using optical fibers that are installed in various locations and states.

BRIEF DESCRIPTION OF DRAWINGS

FIG. 2 is a diagram showing an example of a correspondence table held in a specification unit according to the first example embodiment;

EXAMPLE EMBODIMENT

Hereinafter, with reference to the drawings, example embodiments of the present disclosure will be described. The following descriptions and the drawings are omitted and simplified as appropriate for a purpose of clarifying the description. Throughout the drawings, the same components are denoted by the same reference symbols and overlapping descriptions will be omitted as necessary.

<First Example Embodiment>

Hereinafter, with reference to FIG. 1, a configuration example of an optical fiber sensing system according to a first example embodiment will be described.

Figure 1:
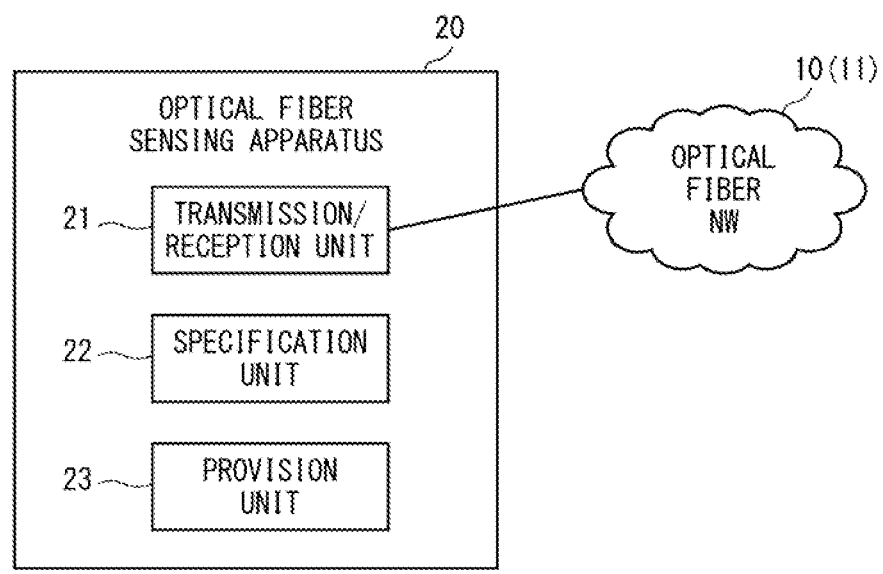
FIG. 1 is a diagram showing a configuration example of an optical fiber sensing system according to a first example embodiment.

As shown in FIG. 1, the optical fiber sensing system according to the first example embodiment includes an optical fiber network (in FIG. 1, it will be shown as an optical fiber Network (NW) as appropriate) 10 and an optical fiber sensing apparatus 20. Further, the optical fiber sensing apparatus 20 includes a transmission/reception unit 21, a specification unit 22, and a provision unit 23.

The optical fiber network 10 is formed of one or more sensing optical fibers 11. The sensing optical fiber 11 is installed, for example, in a structure such as a utility pole, a road, a railroad, sea bed, in the ground, or indoors (e.g., floor, ceiling, or a wall). While the optical fiber network 10 is preferably an existing optical fiber network, the optical fiber network 10 may be an optical fiber network that is newly installed.

The transmission/reception unit 21 sends pulsed light to the sensing optical fiber 11 that forms the optical fiber network 10 and receives, as an optical signal, backward scattered light that has been generated as the pulsed light has been transmitted through the sensing optical fiber 11.

The monitoring targets monitored by the optical fiber sensing system according to the first example embodiment are, for example, as follows.

states of structures such as utility poles, bridges, tunnels, pipes, dams and the like including degradation thereof states of railroads and roads including degradation thereof situations of railroads and roads behavior of persons, vehicles, animals, etc.

monitoring of volcanic eruption, earthquake, landslide, subsidence, sinking and falling, erosion, lake explosion, wind and water damage, wind damage, water damage, salt damage, snow damage, blizzard, freezing damage, lightning, high temperature (heat wave, extreme heat, warm winter), low temperature (severe winter, cold summer), occurrence of natural disasters such as natural fire, and damage status caused by natural disasters occurrence of blackout, construction work, etc.

weather, air temperature, ground temperature, air volume, precipitation monitoring of communication failures Here, vibration, sound, temperature and the like related to the monitoring target are transmitted to the sensing optical fiber 11, superimposed on the optical signal transmitted through the sensing optical fiber 11, and characteristics (e.g., wavelength) of the optical signal are changed. Accordingly, the optical fiber network 10 is able to detect sensing information including vibration, sound, temperature and the like related to the monitoring target and sensing information detected by the optical fiber network 10 is superimposed on the optical signal transmitted through the sensing optical fiber 11. It is sufficient that the sensing information each include at least one of the vibration, the sound, and the temperature related to the monitoring target.

At this time, a plurality of pieces of sensing information related to a plurality of monitoring targets are superimposed on the optical signal transmitted through the sensing optical fiber 11. When, for example, the sensing optical fiber 11 is installed in a utility pole and the sensing information is vibration information, sensing information related to various monitoring targets, such as vibration that has occurred in accordance with the degradation state of the utility pole or vibration that has occurred in accordance with an air volume around the utility pole is superimposed on the optical signal transmitted through the sensing optical fiber 11.

Accordingly, the specification unit 22 is able to specify a plurality of monitoring targets based on a plurality of pieces of sensing information related to a plurality of monitoring targets superimposed on the optical signal transmitted through the sensing optical fiber 11.

Hereinafter, it is assumed that the specification unit 22 specifies two monitoring targets (hereinafter, these targets will be referred to as first and second monitoring targets) for the sake of simplification of the description.

In this case, the specification unit 22 extracts sensing information related to the first monitoring target (hereinafter this information will be referred to as first sensing information) from the optical signal that the transmission/reception unit 21 has received from the optical fiber network 10 and specifies the first monitoring target based on the extracted first sensing information.

Further, the specification unit 22 extracts sensing information related to the second monitoring target (hereinafter this information will be referred to as second sensing information) from the optical signal that the transmission/reception unit 21 has received from the optical fiber network 10 and specifies the second monitoring target based on the extracted second sensing information.

At this time, the specification unit 22 is able to specify the position on the sensing optical fiber 11 where the first and second sensing information have been detected (distance from the optical fiber sensing apparatus 20) as follows. When, for example, the optical signal that the transmission/reception unit 21 receives is backward scattered light, the specification unit 22 specifies, based on the difference between the time when the transmission/reception unit 21 has sent pulsed light to the sensing optical fiber 11 and the time that the transmission/reception unit 21 has received backward scattered light from the sensing optical fiber 11, the position on the sensing optical fiber 11 where the first or second sensing information superimposed on the backward scattered light has been detected.

Further, the specification unit 22 may include information in which the position on the sensing optical fiber 11 and the actual geographical position are associated with each other. The specification unit 22 may hold, for example, a correspondence table in which the distance from the optical fiber sensing apparatus 20 in the sensing optical fiber 11 is associated in advance with each area or each place on the map, as shown in FIG. 2. Accordingly, the specification unit 22 is able to determine in which area and at which point on the map the first or second sensing information has been detected, that is, in which area or at which point on the map the first or second monitoring target has been specified.

The provision unit 23 provides information related to the first and second monitoring targets specified by the specification unit 22 for a service providing destination. At this time, the number of service providing destinations may be one or a plural number. Further, the information related to the first and second monitoring targets may be provided for one service providing destination or may be provided for service providing destinations different from each other.

As described above, the optical fiber sensing apparatus according to the first example embodiment is implemented as a platform when a service for providing information related to the first and second monitoring targets for the service providing destination is implemented.

Hereinafter, an example of a method of specifying the first and second monitoring targets in the specification unit 22 will be described in detail.

For example, vibration information, which corresponds to the sensing information, is superimposed on the optical signal received by the transmission/reception unit 21. This vibration information includes specific dynamic variation patterns with different patterns of the strength of vibration, vibration position, and fluctuation transition of the number of vibrations in accordance with the first monitoring target. Further, this vibration information includes specific dynamic variation patterns in accordance with the second monitoring target as well.

Further, the acoustic information and the temperature information, which correspond to the sensing information, are also superimposed on the optical signal received by the transmission/reception unit 21. Then, the acoustic information and the temperature information include, like the vibration information, the specific dynamic variation patterns in accordance with the first monitoring target and the specific dynamic variation patterns in accordance with the second monitoring target.

Therefore, the specification unit 22 is able to specify the first monitoring target by extracting the first sensing information including the specific dynamic variation pattern in accordance with the first monitoring target from the optical signal received by the transmission/reception unit 21 and analyzing the extracted variation pattern.

Further, the specification unit 22 is able to specify the second monitoring target by extracting the second sensing information including the specific dynamic variation pattern in according with the second monitoring target from the optical signal received by the transmission/reception unit 21 and analyzing the extracted variation pattern.

It is assumed, for example, that the sensing optical fibers 11 are installed in utility poles (e.g., they are overhead wired to the utility poles). In this case, the first and second monitoring targets may be, for example, the degradation state of the utility poles, the air volume around the utility poles, etc. The specification unit 22 is able to specify the degradation state of the utility poles, the air volume around the utility poles by checking, as an example, vibration patterns in accordance therewith.

The specification unit 22 may specify, for example, the degradation state of the utility poles in particular, as follows.

Figure 3:
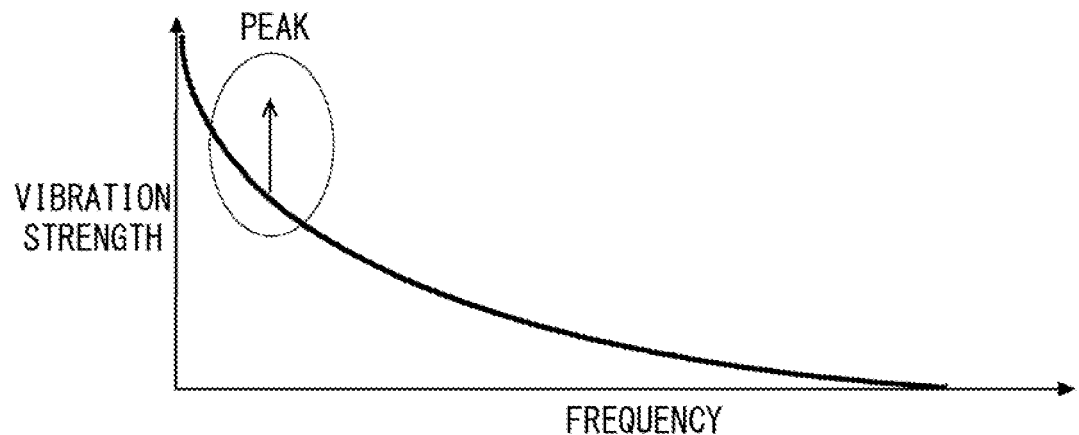
FIG. 3 is a diagram showing an example of a vibration pattern included in sensing information superimposed on an optical signal received by a transmission/reception unit according to the first example embodiment.
Figure 4:
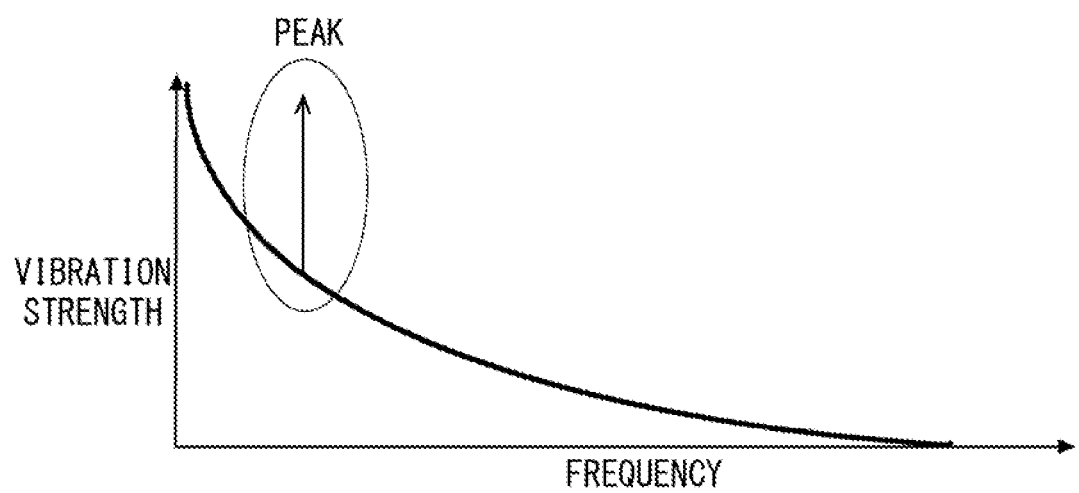
FIG. 4 is a diagram showing an example of a vibration pattern included in the sensing information superimposed on the optical signal received by the transmission/reception unit according to the first example embodiment.

First, the specification unit 22 extracts sensing information including the vibration pattern in accordance with the degradation state of the utility poles as shown in FIGS. 3 and 4 from the optical signal received by the transmission/reception unit 21. FIGS. 3 and 4 each show a pattern of vibration that has occurred in one utility pole, in which the horizontal axis indicates the frequency and the vertical axis indicates the vibration strength.

In the vibration patterns shown in FIGS. 3 and 4, the peak of the vibration strength occurs. The frequency at which this peak occurs varies depending on the degradation state of the utility poles. Specifically, the frequency at which the peak of the strength occurs in the vibration pattern of the deteriorating utility poles (FIG. 4) is shifted to a high-frequency side (or a low-frequency side) compared to the frequency at which the peak of the strength occurs in the vibration pattern of the utility poles at a normal time (FIG. 3). Accordingly, the specification unit 22 is able to specify the degradation state of the utility poles based on the frequency at which the peak of the vibration strength occurs.

It is further assumed that the sensing optical fibers 11 are installed along the road (e.g., installed alongside a road or under the road). In this case, the first and second monitoring targets may be, for example, traffic conditions of the road, conditions of the surface of the road (e.g., freezing, dry, or wet), conditions of tires of vehicles traveling on the road or conditions of occurrence of potholes on the road. The specification unit 22 is able to specify traffic conditions of the road, conditions of tires of vehicles traveling on the road, conditions of occurrence of potholes on the road by checking, as an example, vibration patterns in accordance therewith. Further, the specification unit 22 is able to specify the conditions of the surface of the road by checking, as one example, the temperature pattern in accordance therewith.

The specification unit 22 may specify, for example, the traffic conditions of the road as follows.

Figure 5:
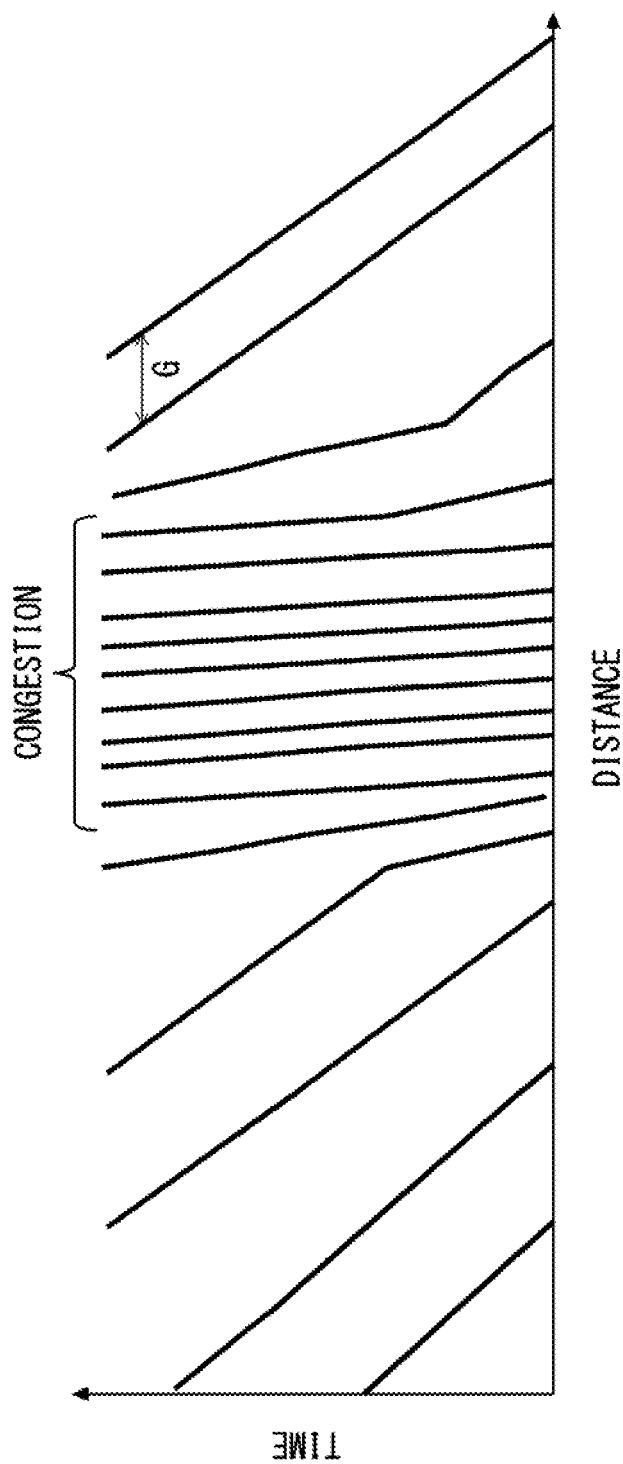
FIG. 5 is a diagram showing an example of a vibration pattern included in the sensing information superimposed on the optical signal received by the transmission/reception unit according to the first example embodiment.

First, the specification unit 22 extracts sensing information including the vibration pattern in accordance with the traffic conditions of the roads shown in FIG. 5 from the optical signal received by the transmission/reception unit 21.

FIG. 5 shows a vibration pattern indicating the time course of a vibration that has occurred in each position on the road, in which the horizontal axis indicates the distance from the optical fiber sensing apparatus 20 and the vertical axis indicates a time. The more positive direction in the vertical axis is, the older the data is.

In the vibration pattern shown in FIG. 5, a state in which one vehicle is traveling on the road is expressed by one diagonal line. The slope of the line indicates the traveling speed of the vehicle, and the smaller the absolute value of the slope of the line is, the faster the traveling speed is. Further, the orientation of the slope of the line indicates the direction in which the vehicle travels, and the change in the slope of the line indicates that the vehicle has accelerated or decelerated. Further, a gap G between lines in the horizontal axis direction indicates the distance between vehicles, and the shorter the gap G is, the shorter the distance between vehicles is.

In the vibration pattern shown in FIG. 5, a plurality of lines located near the center of the horizontal axis have the same inclination direction and large absolute value, and the gaps G between lines are short as well. These characteristics mean that a plurality of vehicles are traveling in the same direction in a low traveling speed, and that the distance between the vehicles is short. It is considered that congestion therefore occurs. On the other hand, it is considered that congestion does not occur in an area other than the center of the horizontal axis. Accordingly, the specification unit 22 is able to specify whether or not there is a congestion as the traffic conditions of the road based on the vibration pattern shown in FIG. 5. The specification unit 22 is able to further specify, as the traffic conditions of the road, the number of vehicles traveling on the road, traveling speed, whether or not there is a dangerous vehicle that repeatedly accelerates and decelerates.

It is further assumed that the sensing optical fibers 11 are installed underground. In this case, the first and second monitoring targets may be, for example, occurrence of natural disasters or actions of persons on the ground. The specification unit 22 is able to specify occurrence of natural disasters or actions of persons by checking, as an example, vibration patterns in accordance therewith.

The specification unit 22 may specify, for example, occurrence of natural disasters, in particular, as follows.

Figure 6:
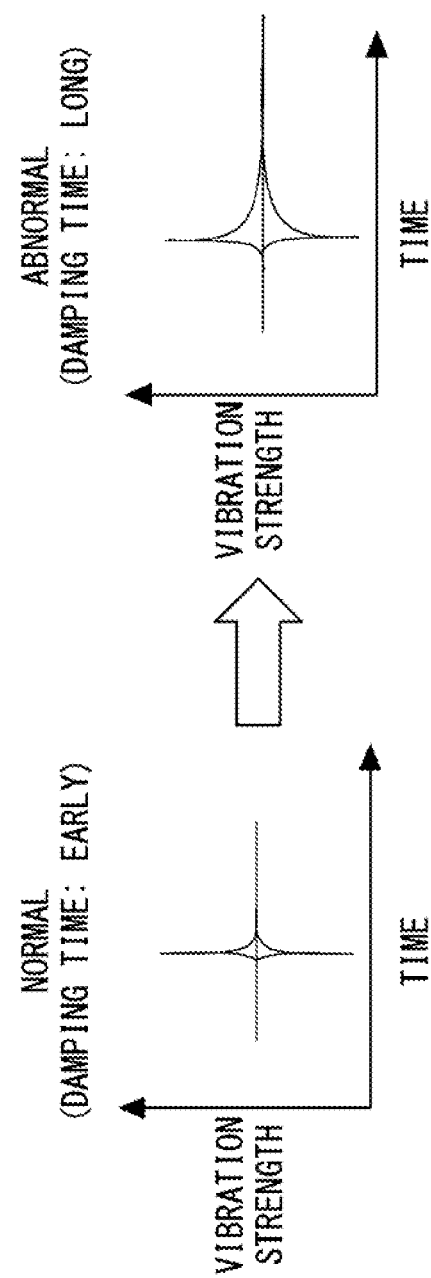
FIG. 6 is a diagram showing an example of a vibration pattern included in the sensing information superimposed on the optical signal received by the transmission/reception unit according to the first example embodiment.

First, the specification unit 22 extracts sensing information including a vibration pattern in accordance with the situation in which natural disasters occur as shown in FIG. 6 from the optical signal received by the transmission/reception unit 21. FIG. 6 shows a pattern of a vibration that has occurred in the ground, in which the horizontal axis indicates a time and the vertical axis indicates the vibration strength.

In the vibration pattern shown in FIG. 6, the vibration that has occurred in the ground is then damped. If, for example, there is a possibility that the structure of the ground will change or collapse may occur as a natural phenomenon, this damping time increases. Accordingly, the specification unit 22 is able to detect that there is a possibility that the structure of the ground will change or collapse may occur based on the damping time.

Further, the specification unit 22 may specify the first and second monitoring targets by using pattern matching. When, for example, the first sensing information is vibration information, the specification unit 22 stores in advance the vibration pattern in accordance with the first monitoring target in a storage unit (not shown) as matching patterns. When, for example, the first monitoring target is a degradation state of utility poles, a plurality of vibration patterns in accordance with the degradation level of the utility poles may be stored. The specification unit 22 compares the vibration pattern included in the first sensing information extracted from the optical signal with the matching patterns. When there is one of the matching patterns whose matching rate with the vibration pattern has become equal to or larger than a threshold, the specification unit 22 determines that the degradation level of the utility poles is a degradation level that corresponds to this matching pattern. The specification unit 22 may specify the second monitoring target in a way similar to that when the first monitoring target is specified.

Alternatively, the specification unit 22 may specify the first and second monitoring targets using a learning model that specifies the monitoring target by a Convolutional Neural Network (CNN). When, for example, the first sensing information is vibration information, the specification unit 22 receives a plurality of sets, each including training data indicating the first monitoring target and the vibration pattern in accordance with the first monitoring target, construct a learning model for the first monitoring target in advance, and stores the learning model in a storage unit (not shown). When, for example, the first monitoring target is a degradation state of utility poles, the specification unit 22 may receive a plurality of sets, each including training data indicating the degradation level of the utility poles and the vibration pattern at this degradation level and construct a learning model for the first monitoring target. The specification unit 22 inputs the vibration pattern included in the first sensing information extracted from the optical signal into the learning model for the first monitoring target. Accordingly, the specification unit 22 obtains the degradation level of the utility poles as the results of outputting the learning model for the first monitoring target. The specification unit 22 may specify the second monitoring target in a way similar to that when the first monitoring target is specified.

While the example of the method for specifying the degradation state of utility poles, traffic conditions of the road etc. has been described above as the first and second monitoring targets, the aforementioned method may be applied in a similar way also in a case in which other monitoring targets are specified.

In the following, with reference to FIG. 7, a flow example of a basic operation in the optical fiber sensing system according to the first example embodiment will be described.

Figure 7:
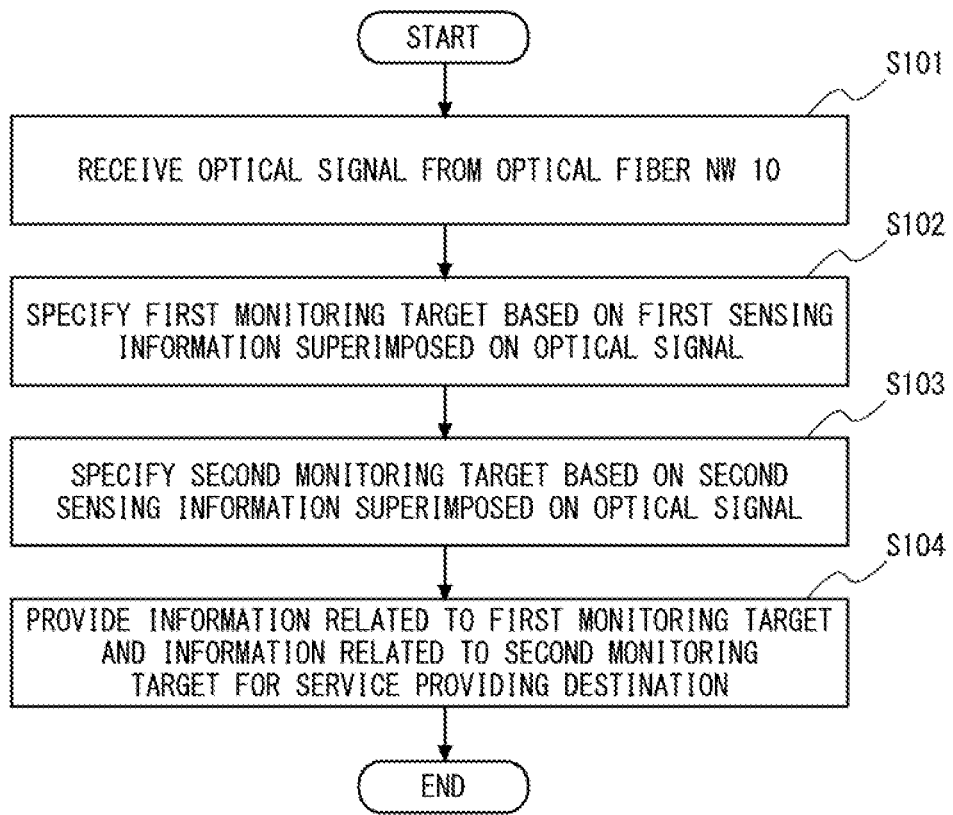
FIG. 7 is a flowchart showing a flow example of a basic operation of an optical fiber sensing system according to the first example embodiment.

As shown in FIG. 7, the transmission/reception unit 21 receives an optical signal from the optical fiber network 10 (Step S101).

Next, the specification unit 22 specifies the first monitoring target based on the first sensing information related to the first monitoring target superimposed on the optical signal received by the transmission/reception unit 21 (Step S102). Further, the specification unit 22 specifies the second monitoring target based on the second sensing information related to the second monitoring target superimposed on the optical signal received by the transmission/reception unit 21 (Step S103). The order in which Step S102 and Step S103 are performed may be reversed.

After that, the provision unit 23 provides the information related to the first monitoring target and the information related to the second monitoring target specified by the specification unit 22 for the service providing destination (Step S104).

As described above, according to the first example embodiment, the transmission/reception unit 21 receives an optical signal from the optical fiber network 10. The specification unit 22 specifies the first monitoring target based on the first sensing information superimposed on the optical signal received by the transmission/reception unit 21 and specifies the second monitoring target based on the second sensing information superimposed on the optical signal received by the transmission/reception unit 21. The provision unit 23 provides the information related to the first monitoring target and the information related to the second monitoring target specified by the specification unit 22 for the service providing destination.

As described above, according to the first example embodiment, a plurality of monitoring targets, namely, the first and second monitoring targets, are monitored instead of monitoring a single monitoring target using the optical fiber network 10. Accordingly, it is possible to provide services and applications by more advanced optical fiber sensing, such as providing information related to a plurality of monitoring targets for the service providing destination using the sensing optical fibers 11 installed in various places and states.

<Second Example Embodiment>

In the aforementioned first example embodiment, only one optical fiber network 10 is provided. On the other hand, the second example embodiment describes an example in which a plurality of optical fiber networks 10 are provided.

Figure 8:
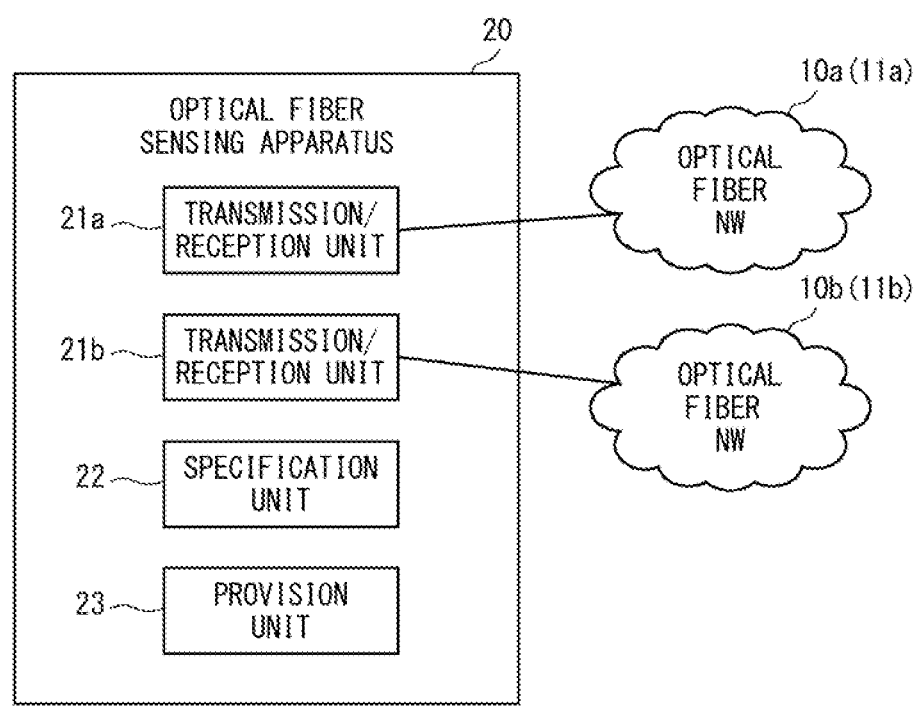
FIG. 8 is a diagram showing a configuration example of an optical fiber sensing system according to a second example embodiment.

Hereinafter, with reference to FIG. 8, a configuration example of an optical fiber sensing system according to the second example embodiment will be described. FIG. 8 is an example in which there are two optical fiber networks 10a and 10b.

As shown in FIG. 8, the optical fiber sensing system according to the second example embodiment is different from that of the aforementioned first example embodiment in that the optical fiber sensing system according to the second example embodiment includes the two optical fiber networks 10a and 10b and includes, inside the optical fiber sensing apparatus 20, two transmission/reception units 21a and 21b that respectively correspond to the two optical fiber networks 10a and 10b.

The optical fiber network 10a is formed of one or more sensing optical fibers 11a. Further, the optical fiber network 10b is formed of one or more sensing optical fibers 11b.

The transmission/reception unit 21a receives an optical signal from the optical fiber network 10a. Further, the transmission/reception unit 21b receives an optical signal from the optical fiber network 10b.

As described above, the specification unit 22 is able to specify a plurality of monitoring targets. It is assumed, in the following, however, that the specification unit 22 specifies first and second monitoring targets, like in the aforementioned first example embodiment, for the sake of simplification of the description.

In this case, the specification unit 22 specifies the first monitoring target based on first sensing information related to the first monitoring target superimposed on one of the optical signal that the transmission/reception unit 21a has received from the optical fiber network 10a and the optical signal that the transmission/reception unit 21b has received from the optical fiber network 10b.

Further, the specification unit 22 specifies the second monitoring target based on second sensing information related to the second monitoring target superimposed on one of the optical signal that the transmission/reception unit 21a has received from the optical fiber network 10a and the optical signal that the transmission/reception unit 21b has received from the optical fiber network 10b.

That is, the specification unit 22 may specify both the first and second monitoring targets using the optical signal from the optical fiber network 10a or specify both the first and second monitoring targets using the optical signal from the optical fiber network 10b. Further, the specification unit 22 may specify the first monitoring target using one of the optical signal from the optical fiber network 10a and the optical signal from the optical fiber network 10b and specify the second monitoring target using the other one of the above optical signals.

Note that the two optical fiber networks 10a and 10b may be owned by business operators different from each other. Further, the two optical fiber networks 10a and 10b may be owned by different business operators in different industries or may be owned by different business operators in the same industry. The types of the business operators may be, for example, a communication carrier, an electric power company, a railroad company, or a road company.

Further, the two optical fiber networks 10a and 10b may be owned by countries, local governments, or organizations (police or fire department) different from each other.

Further, the places where the two optical fiber networks 10a and 10b are installed may be different from each other. The two optical fiber networks 10a and 10b may be disposed, in prefectures different from each other. Further, one of the two optical fiber networks 10a and 10b may be disposed on land and the other one of them may be disposed in the ocean.

Further, the aspect in which the sensing optical fiber 11 is installed in the optical fiber network 10a and the aspect in which the sensing optical fiber 11 is installed in the optical fiber network 10b may be different from each other. For example, the material in which the sensing optical fiber 11a is installed, the state in which it is installed (e.g., installed in the ground or overhead wired to a utility pole or the like), the height of the sensing optical fiber 11a etc. in the optical fiber network 10a may be different from the material in which the sensing optical fiber 11b is installed, the state in which it is installed, the height of the sensing optical fiber 11b etc. in the optical fiber network 10b.

Further, as the two optical fiber networks 10a and 10b, both a public optical fiber network and a private optical fiber network may be used. The public optical fiber network is, for example, an optical fiber network in which a sensing optical fiber is installed in a public infrastructure such as a utility pole, a road, or a railroad. Further, the private optical fiber network is, for example, an optical fiber network in which the sensing optical fiber is installed in a private infrastructure such as a building, a shopping mall, a house, a factory or the like.

In the optical fiber sensing system according to the second example embodiment, when both the first and second monitoring targets are to be specified using an optical signal from one optical fiber network 10a or 10b, the flow of the basic operation becomes the same as that in the aforementioned first example embodiment. Accordingly, the flow of the basic operation in the optical fiber sensing system according to the second example embodiment will not be described.

As described above, according to the second example embodiment, the plurality of optical fiber networks 10a and 10b are provided. The specification unit 22 specifies the first monitoring target based on the first sensing information superimposed on one of the optical signal from the optical fiber network 10a and the optical signal from the optical fiber network 10b and specifies the second monitoring target based on the second sensing information superimposed on one of the optical signal from the optical fiber network 10a and the optical signal from the optical fiber network 10b.

As described above, according to the second example embodiment, by providing the plurality of optical fiber networks 10a and 10b, the range in which the first and second monitoring targets are monitored is extended, whereby a wider variety of monitoring targets can be monitored.

The other effects are similar to those obtained in the aforementioned first example embodiment.

<Third Example Embodiment>

In the aforementioned first example embodiment, the number of service providing destinations may be one or a plural number. On the other hand, in the third example embodiment, the number of service providing destinations is limited to a plural number.

Figure 9:
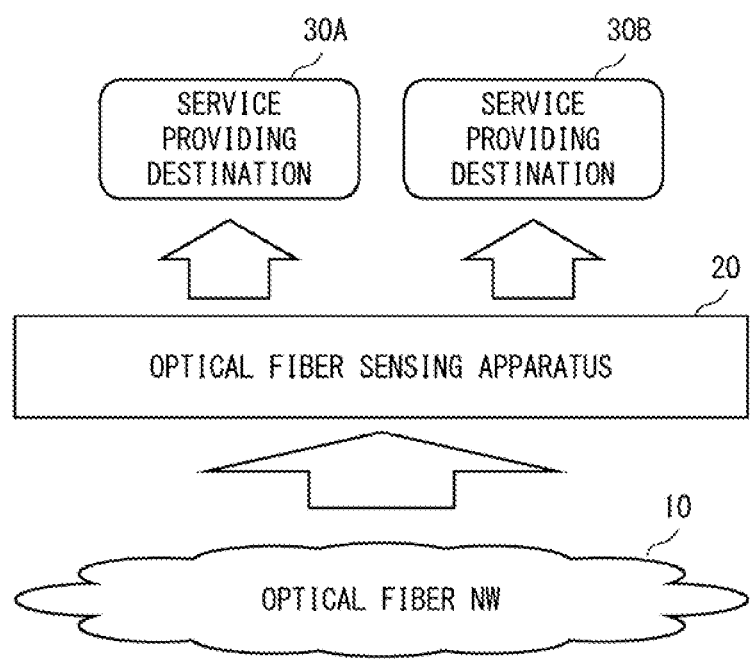
FIG. 9 is a diagram showing a configuration example of an optical fiber sensing system according to a third example embodiment.

Hereinafter, with reference to FIG. 9, a configuration example of an optical fiber sensing system according to the third example embodiment will be described. FIG. 9 is an example in which there are two service providing destinations 30A and 30B. In the following description, when it is not necessary to distinguish between the service providing destinations 30A and 30B, each of them is simply referred to as a service providing destination 30.

As shown in FIG. 9, the optical fiber sensing system according to the third example embodiment is different from that in the aforementioned first example embodiment in that the optical fiber sensing system according to the third example embodiment embodies the two service providing destinations 30A and 30B as service providing destinations for which information related to the monitoring target is provided.

The two service providing destinations 30A and 30B may be, for example, but not limited to, countries, local governments, companies, individual persons etc.

As described above, the specification unit 22 is able to specify a plurality of monitoring targets.

However, the two service providing destinations 30A and 30B do not necessarily require all the pieces of information related to a plurality of monitoring targets that can be specified by the specification unit 22. It can be considered that the necessary information varies depending on the needs by the two service providing destinations 30A and 30B.

Figure 10:
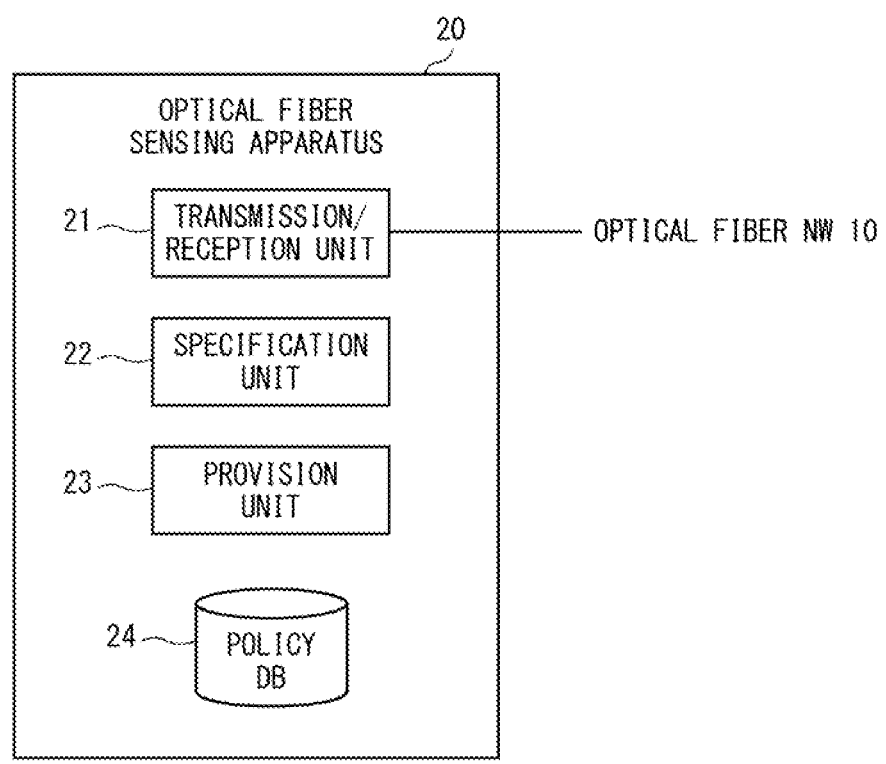
FIG. 10 is a block diagram showing a configuration example of an optical fiber sensing apparatus according to the third example embodiment.
Figures 11, 12:
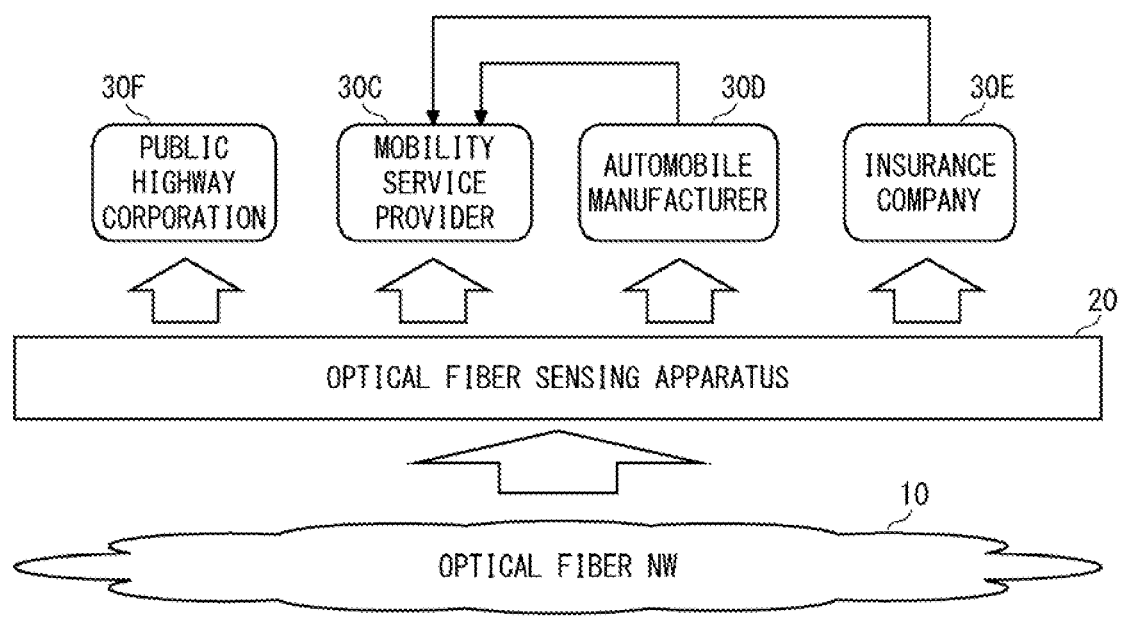
FIG. 11 is a diagram showing an example of the content of a policy DB according to the third example embodiment.
FIG. 12 is a diagram showing a specific configuration example of the optical fiber sensing system according to the third example embodiment.

In view of the above, the optical fiber sensing apparatus 20 according to the third example embodiment additionally includes a policy Data Base (DB) 24, as shown in FIG. 10. The policy DB 24 is a database that stores a policy that indicates the monitoring target that requires information for each of the two service providing destinations 30A and 30B. FIG. 11 shows one example of the content of the policy DB 24 when the specification unit 22 is able to specify two monitoring targets, namely, a first monitoring target x and a second monitoring target y.

The specification unit 22 determines that the service providing destination 30A requires information related to the first monitoring target x and the service providing destination 30B requires information related to the second monitoring target y in accordance with the policy stored in the policy DB 24 shown in FIG. 11.

Accordingly, the specification unit 22 specifies the first monitoring target x, the information on which is required by the service providing destination 30A, using the analysis function in accordance with the service providing destination 30A. Here, the analysis function in accordance with the service providing destination 30A is, for example, a function of extracting, from the optical signal, a specific dynamic variation pattern (at least one of a vibration pattern, an acoustic pattern, and a temperature pattern) in accordance with the first monitoring target x, the information on which is required by the service providing destination 30A. That is, the specification unit 22 specifies the first monitoring target x by extracting the first sensing information including a specific dynamic variation pattern in accordance with the first monitoring target x from the optical signal received by the transmission/reception unit 21 and analyzing the extracted variation pattern.

Further, the specification unit 22 specifies the second monitoring target y, the information on which is required by the service providing destination 30B, using the analysis function in accordance with the service providing destination 30B. The method of specifying the second monitoring target y is similar to the method of specifying the first monitoring target x described above.

The provision unit 23 provides the information related to the first monitoring target x specified by the specification unit 22 for the service providing destination 30A and provides the information related to the second monitoring target y specified by the specification unit 22 for the service providing destination 30B in accordance with the policy stored in the policy DB 24 shown in FIG. 11.

In the following, referring to FIG. 12, a specific configuration example of the optical fiber sensing system according to the third example embodiment will be described.

In the example shown in FIG. 12, a mobility service provider 30C for providing a mobility service for a driver of a connected car, an automobile manufacturer 30D that sells the connected car, an insurance company 30E that enters into insurance contracts with the driver of the connected car, and a public highway corporation 30F that manages roads are provided as the service providing destination 30.

In the example shown in FIG. 12, traffic conditions of the road, conditions of the surface of the road, conditions of tires of vehicles traveling on the road, conditions of occurrence of potholes on the road, etc. are to be monitored.

Hereinafter, an example of information that the provision unit 23 provides for the mobility service provider 30C, the automobile manufacturer 30D, the insurance company 30E, and the public highway corporation 30F and an example of processing that the mobility service provider 30C, the automobile manufacturer 30D, the insurance company 30E, and the public highway corporation 30F execute using the information provided from the provision unit 23 will be described.

(1) Mobility Service Provider 30C

The provision unit 23 provides information related to traffic conditions of a road, conditions of the surface of the road, conditions of tires of vehicles traveling on the road, conditions of occurrence of potholes on the road, etc. specified by the specification unit 22 for the mobility service provider 30C.

The mobility service provider 30C provides, based on the information provided from the provision unit 23 and the positional information such as Global Positioning System (GPS) information of the connected car acquired via a network, the following information customized in accordance with the situations and the conditions of the respective connected cars for drivers of the connected cars via a network.

providing the location of the end of the congestion in order to prevent a traffic accident providing an alternative route in order to avoid a traffic accident providing the positions of potholes in order to prevent a traffic accident providing weather conditions related to roads in order to let the vehicle to slow down providing conditions of the tires of the car such as low pressure, flat tire, unbalanced wheel alignment etc.

(2) Automobile Manufacturer 30D

The provision unit 23 provides information similar to the information provided for the mobility service provider 30C for the automobile manufacturer 30D.

The automobile manufacturer 30D develops a User Interface (UI) for appropriately providing the information provided from the provision unit 23 for a driver of a connected car. Further, the automobile manufacturer 30D uses the information provided from the provision unit 23 to develop a driving assistance function or an automatic driving function.

(3) Insurance Company 30E

The specification unit 22 specifies, when a connected car has a traffic accident, based on the sensing information extracted from the optical signal and the positional information of the connected car acquired via a network, the traveling path of the connected car or the place where the traffic accident has occurred. Further, the specification unit 22 determines whether or not the driver of the connected car has done something to prevent a traffic accident in accordance with the aforementioned information provided from the mobility service provider 30C.

The provision unit 23 provides the results of the determination made in the specification unit 22 for the insurance company 30E.

The insurance company 30E assesses the amount of compensation to be paid to the driver with a dynamic rating based on the results of the determination in the specification unit 22. Further, the insurance company 30E decides the insurance fee of the driver depending on whether the driver is receiving the aforementioned information from the mobility service provider 30C.

(4) Public Highway Corporation 30F

The provision unit 23 provides information similar to the information provided for the mobility service provider 30C for the public highway corporation 30F.

The public highway corporation 30F guides, based on the information provided from the provision unit 23, drivers other than the driver who drives the connected car using, for example, an electric bulletin board to maintain an appropriate traffic amount. Further, the public highway corporation 30F repairs, based on the information provided from the provision unit 23, roads to reduce traffic accidents that may occur due to potholes and the like, and avoids unnecessary lawsuits.

In the example shown in FIG. 12, information to be supplied to the mobility service provider 30C, the automobile manufacturer 30D, the insurance company 30E, and the public highway corporation 30F from the provision unit 23 are kinds of information associated with each other.

Further, for example, the mobility service provider 30C, the automobile manufacturer 30D, and the insurance company 30E can construct a business relation such as providing a connected car for the mobility service provider 30C from the automobile manufacturer 30D and providing information related to insurance for the mobility service provider 30C from the insurance company 30E.

Accordingly, the mobility service provider 30C is able to provide a large variety of mobility services for a driver of a connected car in cooperation with the automobile manufacturer 30D and the insurance company 30E, whereby it is possible to provide various kinds of services and improve the service quality.

Next, in the following, with reference to FIG. 13, a flow example of a basic operation in the optical fiber sensing system according to the third example embodiment will be described. It is assumed here that the specification unit 22 is able to specify the first monitoring target x and the second monitoring target y and the content of the policy DB 24 is as shown in FIG. 11.

Figure 13:
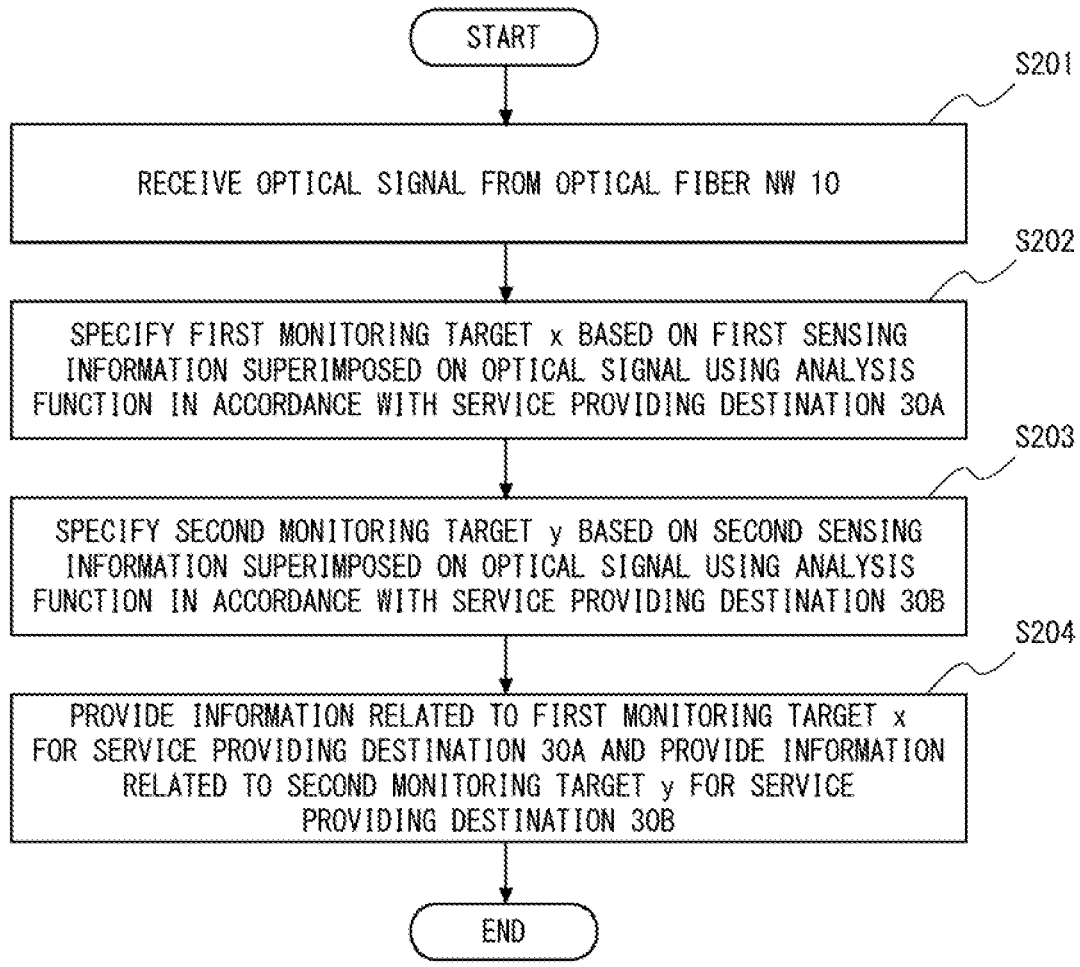
FIG. 13 is a flowchart showing a flow example of the basic operation of the optical fiber sensing system according to the third example embodiment.

As shown in FIG. 13, the transmission/reception unit 21 receives the optical signal from the optical fiber network 10 (Step S201).

Next, the specification unit 22 determines that the service providing destination 30A requires information related to the first monitoring target x in accordance with the policy stored in the policy DB 24. Then, the specification unit 22 specifies, using the analysis function in accordance with the service providing destination 30A, the first monitoring target x based on the first sensing information related to the first monitoring target x superimposed on the optical signal received by the transmission/reception unit 21 (Step S202). Specifically, the specification unit 22 specifies the first monitoring target x by extracting the first sensing information including a specific dynamic variation pattern in accordance with the first monitoring target x from the optical signal received by the transmission/reception unit 21 and analyzing the extracted variation pattern.

Next, the specification unit 22 determines that the service providing destination 30B requires information related to the second monitoring target y in accordance with the policy stored in the policy DB 24. Then, the specification unit 22 specifies the second monitoring target y based on the second sensing information related to the second monitoring target y superimposed on the optical signal received by the transmission/reception unit 21 using the analysis function in accordance with the service providing destination 30B (Step S203). At this time, the specific method of specifying the second monitoring target y is similar to the aforementioned method of specifying the first monitoring target x.

The order of Step 5202 and Step 5203 may be reversed.

After that, the provision unit 23 provides the information related to the first monitoring target x specified by the specification unit 22 for the service providing destination 30A and provides the information related to the second monitoring target y specified by the specification unit 22 for the service providing destination 30B in accordance with the policy stored in the policy DB 24 (Step S204).

As described above, according to the third example embodiment, the specification unit 22 specifies the first monitoring target x based on the first sensing information related to the first monitoring target x, the information on which is required by the service providing destination 30A, using the analysis function in accordance with the service providing destination 30A. Further, the specification unit 22 specifies the second monitoring target y based on the second sensing information related to the second monitoring target y, the information on which is required by the service providing destination 30B, using the analysis function in accordance with the service providing destination 30B.

As described above, according to the third example embodiment, the first monitoring target x, the information on which is required by the service providing destination 30A, is specified using the analysis function in accordance with the service providing destination 30A and the second monitoring target y, the information on which is required by the service providing destination 30B, is specified using the analysis function in accordance with the service providing destination 30B. Accordingly, it is possible to improve the accuracy of specifying the first monitoring target x and the second monitoring target y.

The other effects are similar to those stated in the first example embodiment.

<Other Example Embodiments>

Figure 14:
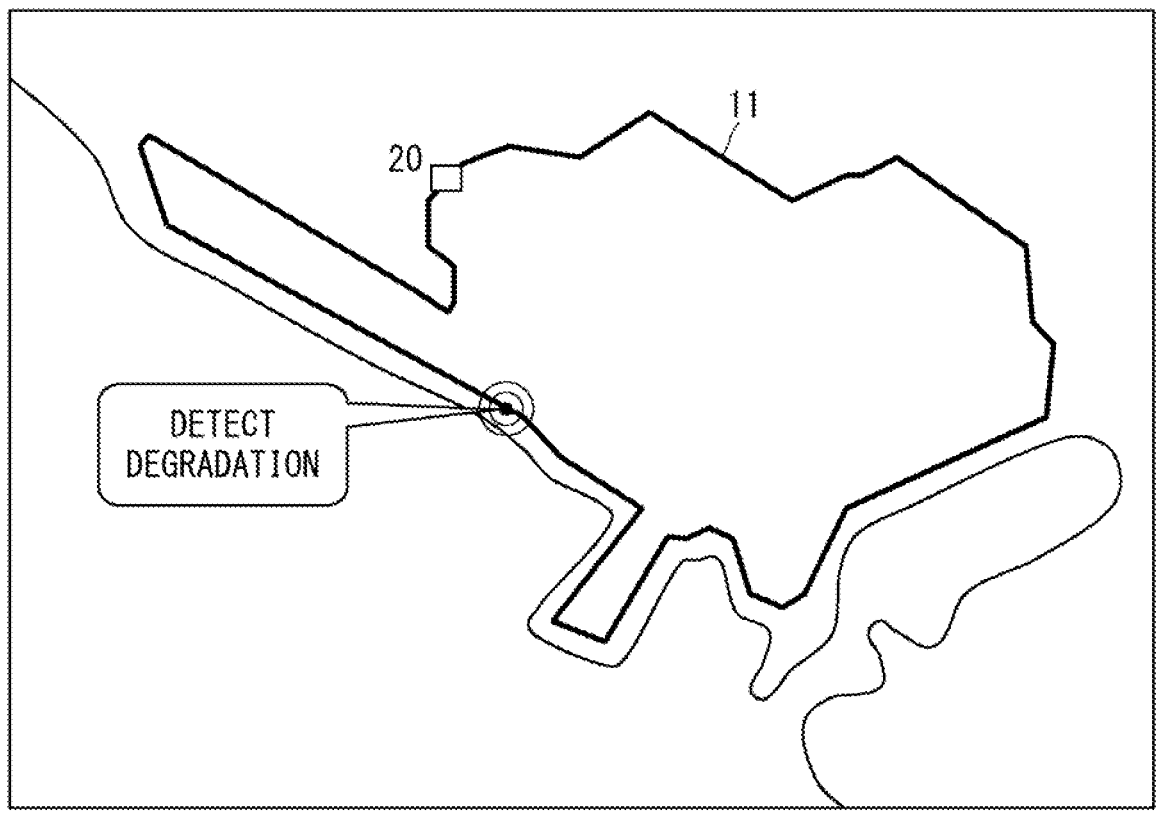
FIG. 14 is a diagram showing one example of a GUI screen that a specification unit according to another example embodiment displays on a display unit.

The specification unit 22 may send, when it has specified a monitoring target, alarm information depending on the specified monitoring target. For example, the specification unit 22 may display a Graphical User Interface (GUI) screen on a monitoring system that monitors the monitoring target or a display unit of a terminal owned by a person who monitors the monitoring target, thereby sending the aforementioned alarm information to the user. In this case, the GUI screen may be, for example, a screen on which map information indicating the area monitored by the optical fiber network 10, information related to the sensing optical fiber 11 that is being installed, information related to the specified monitoring target, and information related to an area or a place where the monitoring target is detected are visually displayed. FIG. 14 shows an example of the GUI screen. FIG. 14 is an example in a case in which the monitoring target is degradation of a structure, in which the location of the deteriorated structure is shown on the map. The monitoring target displayed on the GUI screen is not limited to the deteriorated part and may be various targets such as the state of a vehicle or a train, the traffic, and behavior of persons.

Figure 15:
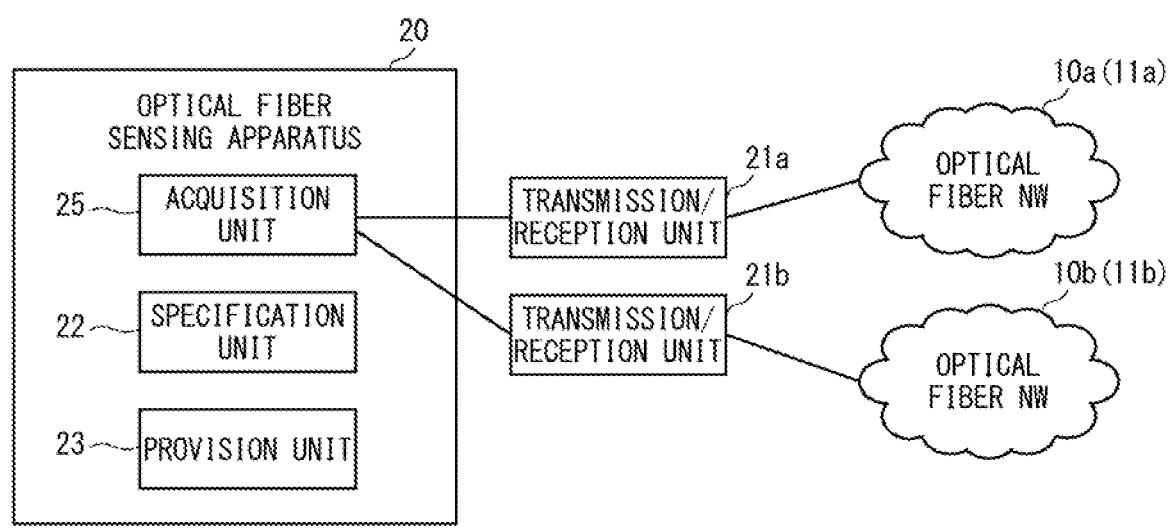
FIG. 15 is a diagram showing a configuration example of an optical fiber sensing system according to another example embodiment.

Further, while the transmission/reception units 21, 21a, and 21b are provided inside the optical fiber sensing apparatus 20 in the aforementioned example embodiments, this is only an example. The transmission/reception units 21, 21a, and 21b may be provided outside the optical fiber sensing apparatus 20. FIG. 15 shows a configuration example of an optical fiber sensing system in which the transmission/reception units 21a and 21b provided inside the optical fiber sensing apparatus 20 in the second example embodiment stated above are provided outside the optical fiber sensing apparatus 20. In the example shown in FIG. 15, in the optical fiber sensing apparatus 20, an acquisition unit 25 is provided in place of the transmission/reception units 21a and 21b. The acquisition unit 25 acquires first sensing information related to a first monitoring target and second sensing information related to a second monitoring target superimposed on one of an optical signal that the transmission/reception unit 21a has received from the optical fiber network 10a and an optical signal that the transmission/reception unit 21b has received from the optical fiber network 10b.

Figure 16:
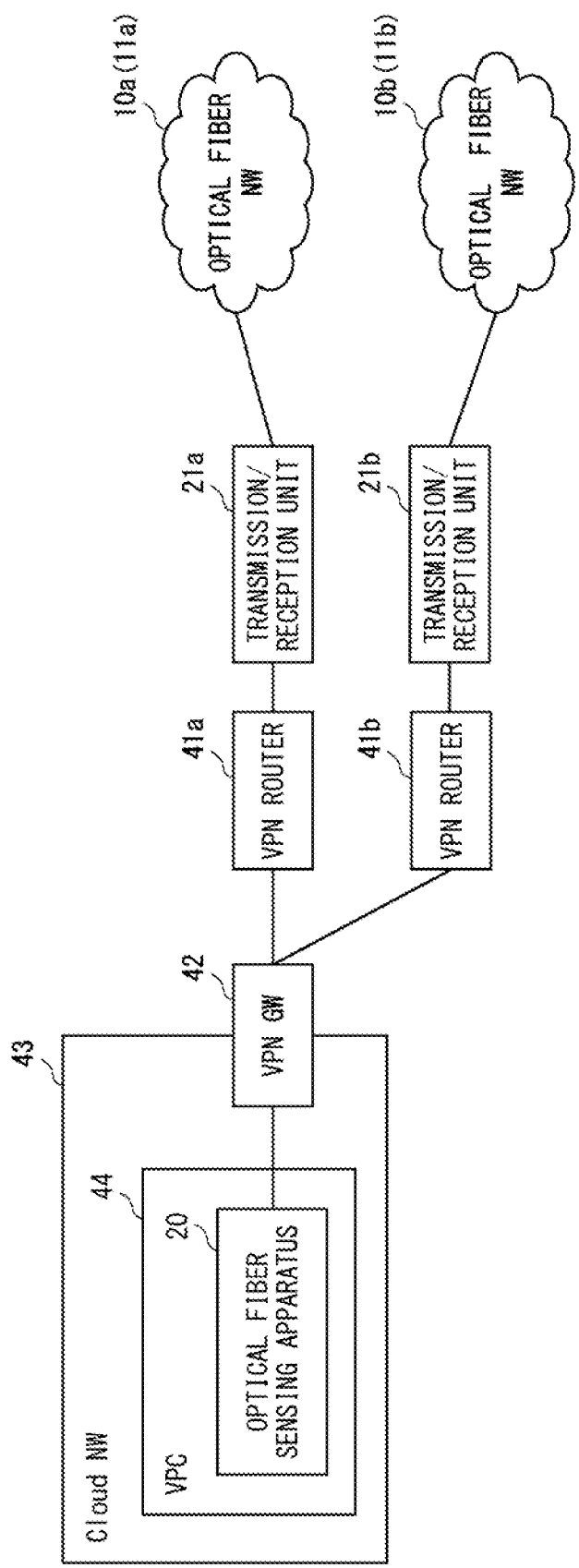
FIG. 16 is a diagram showing a configuration example of a network of the optical fiber sensing system shown in FIG. 15.

Further, in the example shown in FIG. 15, the optical fiber sensing apparatus 20 may be disposed in a position apart from the optical fiber networks 10a and 10b and the transmission/reception units 21, 21a, and 21b, and may be disposed, for example, on the cloud. FIG. 16 shows a configuration example of a network of the optical fiber sensing system shown in FIG. 15 in a case in which the optical fiber sensing apparatus 20 is disposed on the cloud. In the example shown in FIG. 16, the transmission/reception unit 21a is connected to a cloud network 43 via a Virtual Private Network (VPN) router 41a and a VPN Gateway (GW) 42 and the transmission/reception unit 21b is connected to the cloud network 43 via a VPN router 41b and the VPN GW42. The optical fiber sensing apparatus 20 is disposed, for example, in a Virtual Private Cloud (VPC) 44 in the cloud network 43.

<Hardware Configuration of Optical Fiber Sensing Apparatus according to Example Embodiment>

Figure 17:
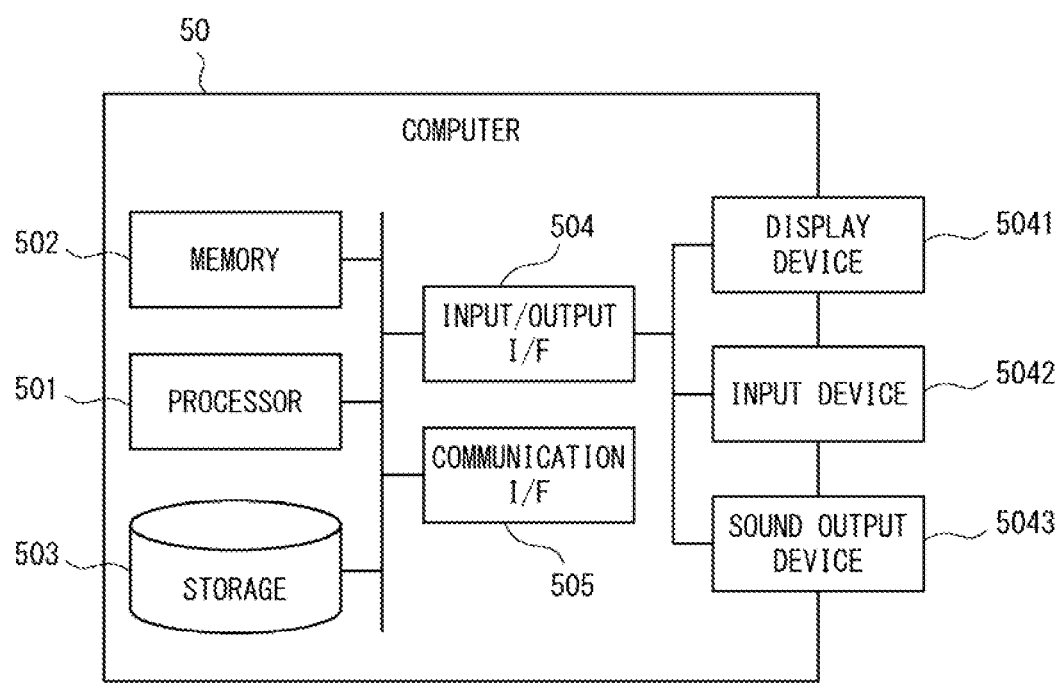
FIG. 17 is a block diagram showing an example of a hardware configuration of a computer that achieves an optical fiber sensing apparatus according to the example embodiment.

Referring next to FIG. 17, a hardware configuration of a computer 50 that achieves the optical fiber sensing apparatus 20 according to the aforementioned example embodiments will be described.

As shown in FIG. 17, the computer 50 includes, for example, a processor 501, a memory 502, a storage 503, an input/output interface (input/output I/F) 504, and a communication interface (communication I/F) 505. The processor 501, the memory 502, the storage 503, the input/output interface 504, and the communication interface 505 are connected to one another by a data transmission path for transmitting or receiving data therebetween.

The processor 501 is, for example, an arithmetic processing apparatus such as a Central Processing Unit (CPU) or a Graphics Processing Unit (GPU).

The memory 502 is, for example, a memory such as a Random Access Memory (RAM) or a Read Only Memory (ROM). The storage 503 is a storage device such as, for example, a Hard Disk Drive (HDD), a Solid State Drive (SSD), or a memory card. Further, the storage 503 may be a memory such as a RAM or a ROM.

The storage 503 stores a program that implements the functions of the components (the transmission/reception units 21, 21a, and 21b, the specification unit 22, and the provision unit 23) included in the optical fiber sensing apparatus 20. The processor 501 executes each of these programs, thereby implementing the functions of the respective components included in the optical fiber sensing apparatus 20. When the processor 501 executes each of these programs, the processor 501 may execute these programs after loading them into the memory 502 or may execute them without loading them into the memory 502. Further, the memory 502 and the storage 503 also serve to store information and data held by the components included in the optical fiber sensing apparatus 20.

The aforementioned programs can be stored and provided to a computer (including the computer 50) using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc (CD)-ROM, CD-Recordable (CD-R), CD-ReWritable (CD-R/W), semiconductor memories (such as mask ROM, Programmable ROM (PROM), Erasable PROM (EPROM), flash ROM, RAM, etc.). Further, the program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

The input/output interface 504 is connected to a display device 5041, an input device 5042, a sound output device 5043 and the like. The display device 5041 is a device such as a Liquid Crystal Display (LCD), a Cathode Ray Tube (CRT) display, or a monitor that displays a screen that corresponds to drawing data processed by the processor 501. The input device 5042 is a device that accepts input from an operator, and is, for example, a keyboard, a mouse, and a touch sensor. The display device 5041 and the input device 5042 may be integrated and may be achieved as a touch panel. The sound output device 5043 is a device such as a speaker that outputs a sound corresponding to acoustic data processed by the processor 501.

The communication interface 505 transmits/receives data to/from an external apparatus. For example, the communication interface 505 communicates with the external apparatus via a wired communication path or a wireless communication path.

While the present disclosure has been described with reference to the example embodiments, the present disclosure is not limited to the aforementioned example embodiments. Various changes that may be understood by one skilled in the art may be made to the configurations and the details of the present disclosure within the scope of the present disclosure.

Some or all of the example embodiments disclosed above may be combined with each other.

The whole or part of the example embodiment disclosed above can be described as, but not limited to, the following supplementary notes.

(Supplementary Note 1)

An optical fiber sensing system comprising:

an optical fiber network that detects first sensing information related to a first monitoring target and second sensing information related to a second monitoring target;

a reception unit configured to receive an optical signal from the optical fiber network;

a specification unit configured to specify the first monitoring target based on the first sensing information superimposed on the optical signal and specify the second monitoring target based on the second sensing information superimposed on the optical signal; and a provision unit configured to provide information related to the first monitoring target and information related to the second monitoring target specified by the specification unit for a service providing destination.

(Supplementary Note 2)

The optical fiber sensing system according to Supplementary Note 1, wherein the provision unit provides the information related to the first monitoring target specified by the specification unit for a first service providing destination, and the provision unit provides the information related to the second monitoring target specified by the specification unit for a second service providing destination.

(Supplementary Note 3)

The optical fiber sensing system according to Supplementary Note 2, wherein the specification unit specifies the first monitoring target based on the first sensing information using an analysis function in accordance with the first service providing destination, and the specification unit specifies the second monitoring target based on the second sensing information using an analysis function in accordance with the second service providing destination.

(Supplementary Note 4)

The optical fiber sensing system according to Supplementary Note 2 or 3, wherein the information related to the first monitoring target provided for the first service providing destination and the information related to the second monitoring target provided for the second service providing destination are kinds of information associated with each other.

(Supplementary Note 5)

The optical fiber sensing system according to any one of Supplementary Notes 1 to 4, comprising a plurality of optical fiber networks, wherein the specification unit specifies the first monitoring target based on the first sensing information included in the optical signal transmitted from one of the plurality of optical fiber networks, and the specification unit specifies the second monitoring target based on the second sensing information included in the optical signal transmitted from one of the plurality of optical fiber networks.

(Supplementary Note 6)

The optical fiber sensing system according to any one of Supplementary Notes 1 to 5, wherein the specification unit specifies the first monitoring target based on a specific dynamic variation pattern in accordance with the first monitoring target, the specific dynamic variation pattern being included in the first sensing information, and the specification unit specifies the second monitoring target based on a specific dynamic variation pattern in accordance with the second monitoring target, the specific dynamic variation pattern being included in the second sensing information.

(Supplementary Note 7)

The optical fiber sensing system according to any one of Supplementary Notes 1 to 6, wherein the first sensing information and the second sensing information each include at least one of a vibration, a sound, and a temperature.

(Supplementary Note 8)

An optical fiber sensing method by an optical fiber sensing system, the optical fiber sensing method comprising:

a receiving step for receiving an optical signal from an optical fiber network that detects first sensing information related to a first monitoring target and second sensing information related to a second monitoring target;

a specifying step for specifying the first monitoring target based on the first sensing information superimposed on the optical signal and specifying the second monitoring target based on the second sensing information superimposed on the optical signal; and a providing step for providing information related to the first monitoring target and information related to the second monitoring target specified in the specifying step for a service providing destination.

(Supplementary Note 9)

The optical fiber sensing method according to Supplementary Note 8, wherein in the providing step, the information related to the first monitoring target specified in the specifying step is provided for a first service providing destination, and the information related to the second monitoring target specified in the specifying step is provided for a second service providing destination.

(Supplementary Note 10)

The optical fiber sensing method according to Supplementary Note 9, wherein in the specifying step, the first monitoring target is specified based on the first sensing information using an analysis function in accordance with the first service providing destination, and the second monitoring target is specified based on the second sensing information using an analysis function in accordance with the second service providing destination.

(Supplementary Note 11)

The optical fiber sensing method according to Supplementary Note 9 or 10, wherein the information related to the first monitoring target provided for the first service providing destination and the information related to the second monitoring target provided for the second service providing destination are kinds of information associated with each other.

(Supplementary Note 12)

The optical fiber sensing method according to any one of Supplementary Notes 8 to 11, wherein a plurality of optical fiber networks are provided in the optical fiber sensing system, and in the specifying step, the first monitoring target is specified based on the first sensing information included in the optical signal transmitted from one of the plurality of optical fiber networks, and the second monitoring target is specified based on the second sensing information included in the optical signal transmitted from one of the plurality of optical fiber networks.

(Supplementary Note 13)

The optical fiber sensing method according to any one of Supplementary Notes 8 to 12, wherein in the specifying step, the first monitoring target is specified based on a specific dynamic variation pattern in accordance with the first monitoring target, the specific dynamic variation pattern being included in the first sensing information, and the second monitoring target is specified based on a specific dynamic variation pattern in accordance with the second monitoring target, the specific dynamic variation pattern being included in the second sensing information.

(Supplementary Note 14)

The optical fiber sensing method according to any one of Supplementary Notes 8 to 13, wherein the first sensing information and the second sensing information each include at least one of a vibration, a sound, and a temperature.

(Supplementary Note 15)

An optical fiber sensing apparatus comprising:

a reception unit configured to receive an optical signal from an optical fiber network that detects first sensing information related to a first monitoring target and second sensing information related to a second monitoring target;

a specification unit configured to specify the first monitoring target based on the first sensing information superimposed on the optical signal and specify the second monitoring target based on the second sensing information superimposed on the optical signal; and a provision unit configured to provide information related to the first monitoring target and information related to the second monitoring target specified by the specification unit for a service providing destination.

(Supplementary Note 16)

The optical fiber sensing apparatus according to Supplementary Note 15, wherein the provision unit provides the information related to the first monitoring target specified by the specification unit for a first service providing destination, and the provision unit provides the information related to the second monitoring target specified by the specification unit for a second service providing destination.

(Supplementary Note 17)

The optical fiber sensing apparatus according to Supplementary Note 16, wherein the specification unit specifies the first monitoring target based on the first sensing information using an analysis function in accordance with the first service providing destination, and the specification unit specifies the second monitoring target based on the second sensing information using an analysis function in accordance with the second service providing destination.

(Supplementary Note 18)

The optical fiber sensing apparatus according to Supplementary Note 16 or 17, wherein the information related to the first monitoring target provided for the first service providing destination and the information related to the second monitoring target provided for the second service providing destination are kinds of information associated with each other.

(Supplementary Note 19)

The optical fiber sensing apparatus according to any one of Supplementary Notes 15 to 18, wherein a plurality of optical fiber networks are provided, the specification unit specifies the first monitoring target based on the first sensing information included in the optical signal transmitted from one of the plurality of optical fiber networks, and the specification unit specifies the second monitoring target based on the second sensing information included in the optical signal transmitted from one of the plurality of optical fiber networks.

(Supplementary Note 20)

The optical fiber sensing apparatus according to any one of Supplementary Notes 15 to 19, wherein the specification unit specifies the first monitoring target based on a specific dynamic variation pattern in accordance with the first monitoring target, the specific dynamic variation pattern being included in the first sensing information, and the specification unit specifies the second monitoring target based on a specific dynamic variation pattern in accordance with the second monitoring target, the specific dynamic variation pattern being included in the second sensing information.

(Supplementary Note 21)

The optical fiber sensing apparatus according to any one of Supplementary Notes 15 to 20, wherein the first sensing information and the second sensing information each include at least one of a vibration, a sound, and a temperature.

REFERENCE SIGNS LIST 10, 10a, 10b Optical Fiber Network
11, 11a, 11b Sensing Optical Fiber
20 Optical Fiber Sensing Apparatus
21, 21a, 21b Transmission/reception Unit
22 Specification Unit
23 Provision Unit
24 Policy DB
25 Acquisition Unit
30A, 30B Service Providing Destination
30C Mobility Service Provider
30D Automobile Manufacturer
30E Insurance Company
30F Public Highway Corporation
41a, 41b VPN Router
42 VPN GW
43 Cloud Network
44 VPC
50 Computer
501 Processor
502 Memory
503 Storage 504 Input/output Interface
5041 Display Device
5042 Input Device
5043 Sound Output Device
505 Communication Interface

What is claimed is:

1. An optical fiber sensing system comprising:
an optical fiber network that detects first sensing information related to a first monitoring target and second sensing information related to a second monitoring target;
a memory storing instructions; and
at least one processor, by executing the instructions, configured to implement:
a reception unit configured to receive an optical signal from the optical fiber network;
a specification unit configured to specify the first monitoring target based on the first sensing information superimposed on the optical signal and specify the second monitoring target based on the second sensing information superimposed on the optical signal; and
a provision unit configured to provide information related to the first monitoring target and information related to the second monitoring target specified by the specification unit for a service providing destination,
wherein the provision unit is further configured to:
provide the information related to the first monitoring target specified by the specification unit for a first service providing destination, and
provide the information related to the second monitoring target specified by the specification unit for a second service providing destination.

2. The optical fiber sensing system according to claim 1, wherein
the specification unit specifies the first monitoring target based on the first sensing information using an analysis function in accordance with the first service providing destination, and
the specification unit specifies the second monitoring target based on the second sensing information using an analysis function in accordance with the second service providing destination.

3. The optical fiber sensing system according to claim 1, wherein the information related to the first monitoring target provided for the first service providing destination and the information related to the second monitoring target provided for the second service providing destination are kinds of information associated with each other.

4. The optical fiber sensing system according to claim 1, comprising a plurality of optical fiber networks, wherein
the specification unit specifies the first monitoring target based on the first sensing information included in the optical signal transmitted from one of the plurality of optical fiber networks, and
the specification unit specifies the second monitoring target based on the second sensing information included in the optical signal transmitted from one of the plurality of optical fiber networks.

5. The optical fiber sensing system according to claim 1, wherein
the specification unit specifies the first monitoring target based on a specific dynamic variation pattern in accordance with the first monitoring target, the specific dynamic variation pattern being included in the first sensing information, and
the specification unit specifies the second monitoring target based on a specific dynamic variation pattern in accordance with the second monitoring target, the specific dynamic variation pattern being included in the second sensing information.

6. The optical fiber sensing system according to claim 1, wherein the first sensing information and the second sensing information each include at least one of a vibration, a sound, and a temperature.

7. An optical fiber sensing method by an optical fiber sensing system, the method comprising:
receiving an optical signal from an optical fiber network that detects first sensing information related to a first monitoring target and second sensing information related to a second monitoring target;
specifying the first monitoring target based on the first sensing information superimposed on the optical signal and specifying the second monitoring target based on the second sensing information superimposed on the optical signal; and
providing information related to the first monitoring target and information related to the second monitoring target specified in the specifying operation for a service providing destination,
wherein the information related to the first monitoring target specified in the specifying operation is provided for a first service providing destination, and
wherein the information related to the second monitoring target specified in the specifying operation is provided for a second service providing destination.

8. The optical fiber sensing method according to claim 7, wherein
in the specifying operation,
the first monitoring target is specified based on the first sensing information using an analysis function in accordance with the first service providing destination, and
the second monitoring target is specified based on the second sensing information using an analysis function in accordance with the second service providing destination.

9. The optical fiber sensing method according to claim 7, wherein the information related to the first monitoring target provided for the first service providing destination and the information related to the second monitoring target provided for the second service providing destination are kinds of information associated with each other.

10. The optical fiber sensing method according to claim 7, wherein
a plurality of optical fiber networks are provided in the optical fiber sensing system, and
in the specifying operation,
the first monitoring target is specified based on the first sensing information included in the optical signal transmitted from one of the plurality of optical fiber networks, and
the second monitoring target is specified based on the second sensing information included in the optical signal transmitted from one of the plurality of optical fiber networks.

11. The optical fiber sensing method according to claim 7, wherein
in the specifying operation,
the first monitoring target is specified based on a specific dynamic variation pattern in accordance with the first monitoring target, the specific dynamic variation pattern being included in the first sensing information, and the second monitoring target is specified based on a specific dynamic variation pattern in accordance with the second monitoring target, the specific dynamic variation pattern being included in the second sensing information.

12. An optical fiber sensing apparatus comprising:
a memory storing instructions; and
at least one processor, by executing the instructions, configured to implement:
  a reception unit configured to receive an optical signal from an optical fiber network that detects first sensing information related to a first monitoring target and second sensing information related to a second monitoring target;
  a specification unit configured to specify the first monitoring target based on the first sensing information superimposed on the optical signal and specify the second monitoring target based on the second sensing information superimposed on the optical signal; and
  a provision unit configured to provide information related to the first monitoring target and information related to the second monitoring target specified by the specification unit for a service providing destination
wherein the provision unit is further configured to:
  provide the information related to the first monitoring target specified by the specification unit for a first service providing destination, and
  provide the information related to the second monitoring target specified by the specification unit for a second service providing destination.

13. The optical fiber sensing apparatus according to claim 12, wherein
  the specification unit specifies the first monitoring target based on the first sensing information using an analysis function in accordance with the first service providing destination, and
  the specification unit specifies the second monitoring target based on the second sensing information using an analysis function in accordance with the second service providing destination.

14. The optical fiber sensing apparatus according to claim 12, wherein the information related to the first monitoring target provided for the first service providing destination and the information related to the second monitoring target provided for the second service providing destination are kinds of information associated with each other.

15. The optical fiber sensing apparatus according to claim 12, wherein
  a plurality of optical fiber networks are provided,
  the specification unit specifies the first monitoring target based on the first sensing information included in the optical signal transmitted from one of the plurality of optical fiber networks, and
  the specification unit specifies the second monitoring target based on the second sensing information included in the optical signal transmitted from one of the plurality of optical fiber networks.

16. The optical fiber sensing apparatus according to claim 12, wherein
  the specification unit specifies the first monitoring target based on a specific dynamic variation pattern in accordance with the first monitoring target, the specific dynamic variation pattern being included in the first sensing information, and
  the specification unit specifies the second monitoring target based on a specific dynamic variation pattern in accordance with the second monitoring target, the specific dynamic variation pattern being included in the second sensing information.

17. The optical fiber sensing apparatus according to claim 12, wherein the first sensing information and the second sensing information each include at least one of a vibration, a sound, and a temperature.

* * * * *